CLUTCH AND BRAKE MECHANISM WITH ENERGY STORING MEANS

Filed April 19, 1965 3 Sheets-Sheet 1

INVENTOR

J. E. SHEPARD

BY J. Jancin Jr.

ATTORNEY

1

3,298,485
CLUTCH AND BRAKE MECHANISM WITH ENERGY STORING MEANS

Joseph E. Shepard, Los Gatos, Calif., assignor to International Business Machines Corporation, Armonk, N.Y., a corporation of New York Filed Apr. 19, 1965, Ser. No. 449,065
11 Claims. (Cl. 192—12)

This invention relates to brakes and more particularly to brakes designed to quickly arrest the motion of rotating members.

As those skilled in the art will appreciate, the need for high capability braking systems has been one of long standing. This need has become even more acute in recent years with the advent of large scale automation. For example, consider an automated system comprising an electronic digital computer having a magnetic tape input device. Due to the electronic nature of the computer, the computer is capable of processing data at rates which far exceed those at which it is possible to transfer data from the tape to the computer. To reduce the waste of computer capability inherent in such rate differentials, computer system designers have been forced to vastly increase the speed at which the magnetic tape moves with respect to the magnetic tape transducer. This increase in speed coupled with the advent of random access storage, has put great demands on the design of braking devices suitable for accurately and quickly arresting the motion of rotating bodies such as magnetic tape reels. This is only one example of where rapidly changing electronic technologies, which are so much a part of automation, impose enormous demands on the design of mechanical devices, particularly on the design of braking mechanisms.

Unfortunately, up to now, the available mechanical braking mechanisms have not been entirely satisfactory. In fact, as those skilled in the art will appreciate, the prior art brakes have numerous operational disadvantages. For example, with some there is an undue delay between initiating braking action and completely stopping the rotating member. Such a delay, if it occurs in a magnetic tape feeding mechanism, extends the duty cycle of an accessing operation thereby reducing the overall data transfer rate between the tape and the computer. Brakes which have overcome this delay problem and can abruptly stop a rotating member, can generally not do so without introducing damaging vibrations which, in addition to shortening the life of the braking mechanism itself, also damages associated equipment. In the few cases where vibrations have been eliminated, it has not been without resort to expensive electromechanical clutching arrangements.

Another problem with existing braking mechanisms is their tendency to require periodic adjustments as the component parts thereof wear. Without such adjustments, uniform braking characteristics do not prevail over a given period of time.

A very serious problem with many of the prior braking mechanisms is the marked influence the inertia of the rotating member has on the time it takes to arrest the motion of the rotating member. The adverse effects of this dependence of braking time on inertia is particularly pronounced when utilizing the brake to stop a reel of

2 magnetic tape. Such is the case because the amount of tape in a reel, and hence the inertia of the reel, varies greatly throughout the operation of the magnetic tape storage device. Thus, the stopping time will not be constant throughout the operation of the storage device, but will fluctuate in accordance with the reel contends introducing addressing errors.

Finally, many of the prior art braking mechanisms are undirectional in the sense that they are able to stop the motion of a rotating member only if it is rotating in a given direction relative to the brake. If the member to be stopped rotates in the other direction, unidirectional brakes are unable to arrest the motion.

It is, therefore, an object of this invention to provide an improved braking mechanism for arresting the motion of rotating member which overcomes the above-mentioned shortcomings of the prior art.

It is another object of this invention to provide an improved braking mechanism which has the capability of arresting motion of a member regardless of the direction of rotation.

It is still another object of this invention to provide a braking mechanism which employs few moving parts.

It is a further object of this invention to provide an improved braking mechanism which arrests the motion of the rotating member extremely rapidly and without appreciable vibration.

It is still another object of this invention to provide an improved braking mechanism, the operation of which is substantially independent of the inertia of the load.

It is yet another object of this invention to provide an improved braking mechanism which requires no adjustments thereto due to wear of the components of the braking mechanism.

It is another object of this invention to provide an improved braking mechanism which does not utilize friction to effect braking action and, therefore, does not require periodic replacement of friction surfaces.

It is a further object of this invention to provide a braking mechanism which can be easily modified if variations in braking characteristics are desired.

It is a still further object of this invention to provide a braking mechanism which accomplishes all of the above-mentioned objects but is not restricted in its use to any greater extent than prior art braking mechanisms of the same general type.

Therefore, in accordance with one aspect of this invention, a braking mechanism is provided for arresting the motion of a rotating member which includes a first means mounted for rotation and coupled to the rotating member via a clutch. The clutch is such that it engages when the rotating member rotates and disengages when the rotating member is at rest. Also provided is a braking means including a torque transmitting means and an actuating means. The torque transmitting means, which is mounted on a supporting means and movable relative thereto, is in torque transmitting engagement with the first means. The actuating means, which is in motion transmitting engagement with the torque transmitting means, is movable from a first position to a second position for imparting motion to the torque transmitting means to effectively arrest the motion of the rotating member. This actuating means is initially positioned in the first position in response to motion transmitted to the torque transmitting means by rotation of the first means. In addition to the above elements of the braking mechanism, a selectively operable means is provided for preventing relative motion between the first means and the torque transmitting means.

In operation, as the rotating member starts from rest the clutch is engaged imparting motion to the first means. The initial rotation of the first means is transmitted to the actuating means via the torque transmitting means to position the actuating means in the first position. With the actuating means in the first position, the selectively operable means is activated to prevent relative motion between the torque transmitting means and the first means. As a consequence, the entire braking mechanism now rotates as an entity under the action of the rotating member. When braking action is desired, the selectively operable means is deactivated allowing relative motion between the torque transmitting means and the first means resulting in movement of the actuating means from the first position to the second position. This movement of the actuating member causes a braking torque to be applied to the first means via the transmitting means, arresting the motion of the rotating member. Stopping the rotating member disengages the clutch permitting the first means to continue rotating independently of the now stationary rotating member.

In accordance with a more detailed aspect of this invention a braking mechanism is provided for arresting the motion of a rotating member, which includes a first gear mounted for rotation about its axis and operatively connected to the rotating member by a clutch which is engaged when the rotating member is rotating and disengaged when the rotating member has come to rest. The first gear has extended hubs on both sides thereof. On each of these hubs is mounted a supporting disc. A second gear, located between the supporting discs, is mounted thereto for rotation about its axis in mating relationship with the first gear. Rigidly connected to the second gear and having a center of gravity radially displaced therefrom, is an actuating means. To prevent relative motion between the gears, a selectively operable means is provided which, except when it is desired to start or to arrest the motion of the shaft, holds the actuating means in a radially retracted position.

Operation of this braking mechanism is similar to that described with respect to the previously described braking mechanism. Specifically, the selectively operable means is deactivated, allowing relative motion between the first gear and the supporting disc prior to applying power to the rotating member. With the selectively operable means deactivated and power applied to the rotating member, the rotating member begins to rotate imparting motion via the clutch to the first gear. The first gear rotates the second gear moving the means with the offset center of gravity, i.e., the actuating means, to an operating position. When the means with the offset center of gravity has moved to the operating position, the selectively operable means is activated. Motion between the gears is now prevented and the entire braking mechanism rotates as an entity. To arrest the motion of the rotating member it is necessary to deactivate the selectively operable means, thereby allowing the actuating means to fly radially outwardly under the action of centrifugal force. As the actuating means flys outward, the second gear rotates in such a manner as to apply a braking torque to the first gear arresting the motion of the rotating member. Once the rotating member has come to rest, the braking mechanism is free to continue rotating, the clutch having become disengaged.

Braking mechanisms constructed in accordance with the principles of this invention have been found to have a number of advantages. Specifically, the brake of this invention is extremely suitable in applications where space is at a premium. Brakes of this invention have also been found to be satisfactory when constructed from components which have not been manufactured according to strict tolerances. Finally, the brake of this invention can be embodied in conventional motors with a minimum of modifications to the motor.

The foregoing and other objects, features and advantages of the invention will be apparent from the following more particular description of the preferred embodiments of the invention, as illustrated in the drawings.

In the drawings wherein like numerals represent like elements:

Figure 4A:
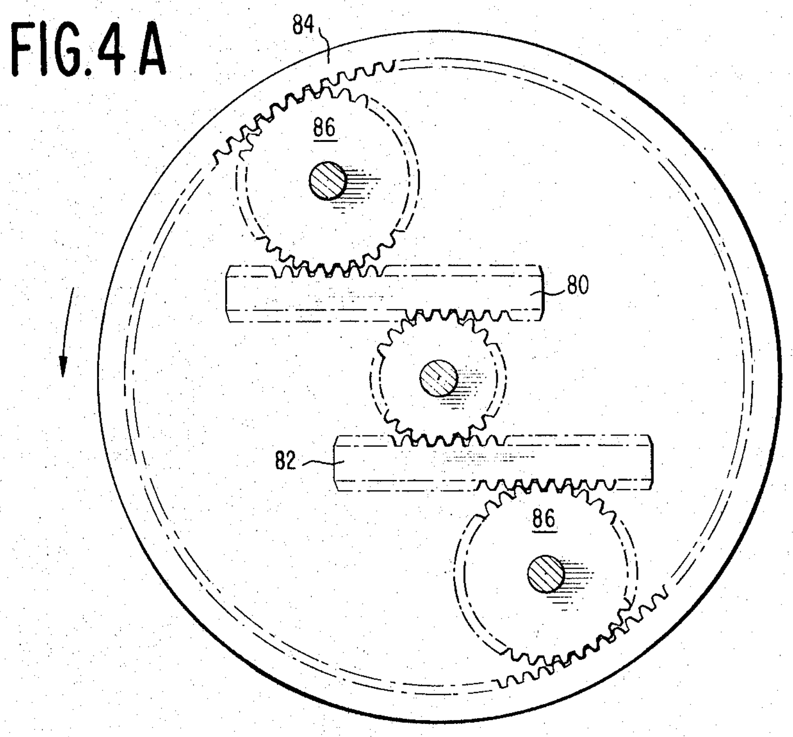
Figure 4B:
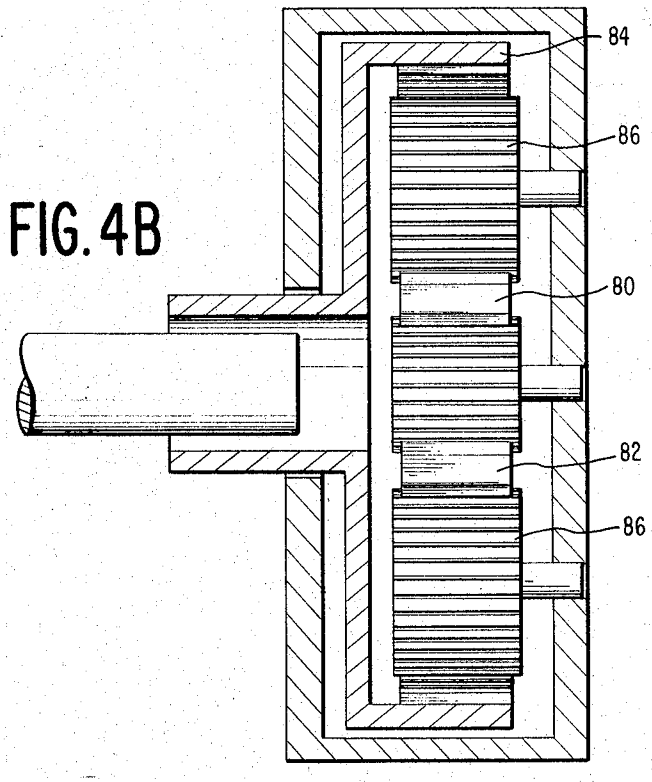

FIGS. 4(*a*) and 4(*b*) depict sectional views of another embodiment of the invention, utilizing racks instead of planet gears and associated arms. For the purposes of clarity, clutching means, limit stops, guides, and other minor details have been omitted from these figures.

*Description*

Figure 1:
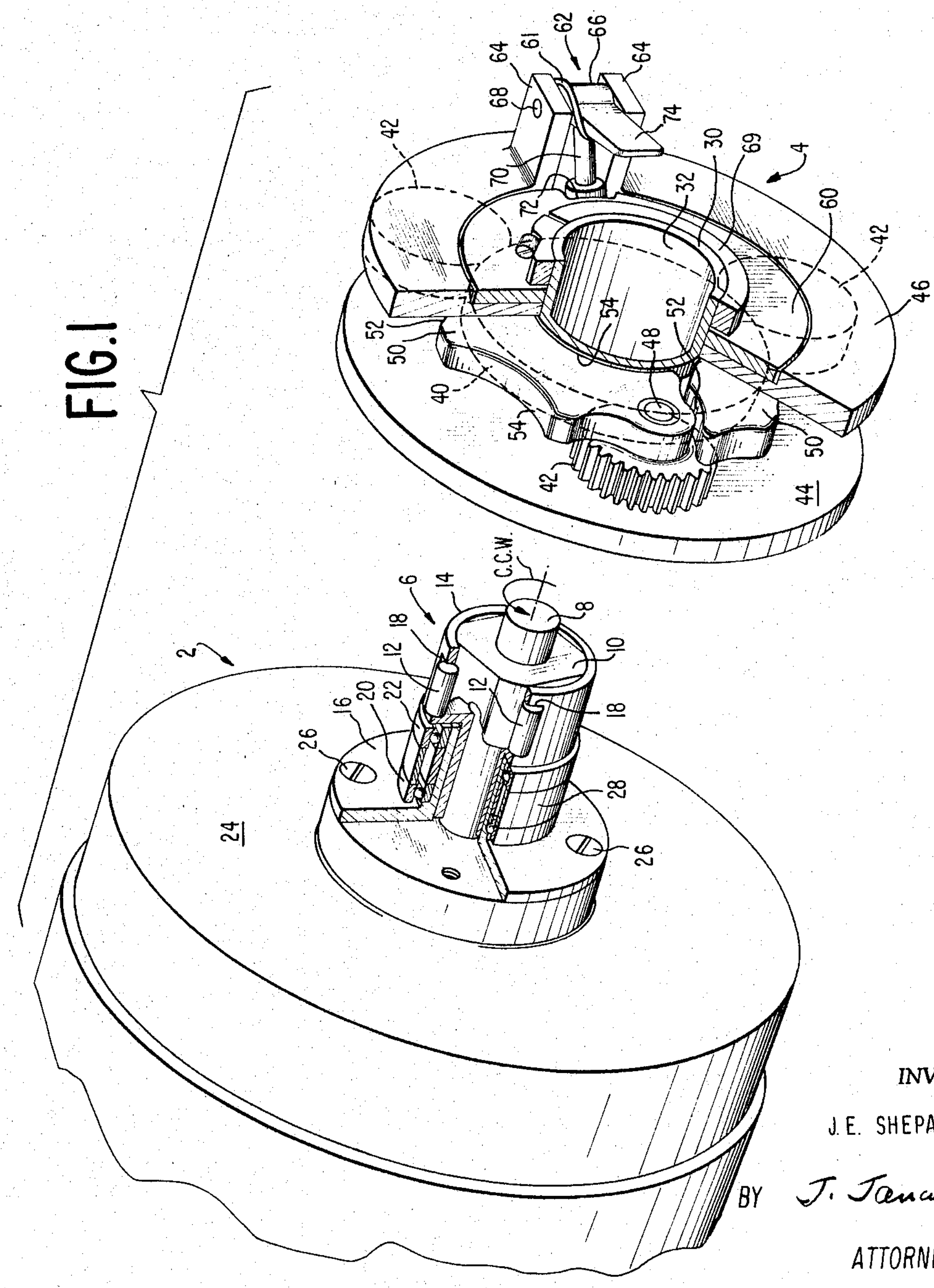
FIG. 1 depicts a partially sectioned and partially exploded view in perspective of a braking mechanism constructed in accordance with the principles of this inveniton. In this view, the elements of the braking mechanism are shown in the positions they occupy when the braking mechanism is being driven in a counterclockwise direction by the rotating member.

Now, referring to FIG. 1, a preferred embodiment of a braking mechanism constructed in accordance with the principles of this invention is depicted in its operating environment. Basically what is shown is an electric motor 2 coupled to a braking mechanism 4 by a clutch 6. The motor 2 is of any conventional type suitable for driving a rotating member such as a shaft 8. The motor may be unidirectional or bidirectional and for the purpose of generalizing the description to follow, it will be considered to be bidirectional.

In order to obtain the mechanical energy required for arresting the motion of the rotating shaft 8 when braking is desired, it is necessary to rotate the braking mechanism 4 and it is for this purpose that the clutch 6 is provided. The clutch 6 is a conventional clutch of the overriding type. As those skilled in the art will understand, such a clutch automatically engages when the shaft 8 rotates and disengages when the shaft comes to rest. While some varieties of commercially available overriding clutches engage only when a shaft rotates in a specified direction, the clutch 6 depicted in FIG. 1 is not of this type, but rather is of the type which engages regardless of the direction of shaft rotation. A bidirectional clutch such as shown in FIG. 1 is required if a bidirectional motor is utilized inasmuch as braking action in either direction may be required. Of course, if rotation in a particular application is only to be in one direction, a unidirectional overriding clutch will be sufficient.

The bidirectional overriding clutch 6 selected for illustrating the preferred embodiment of the braking mechanism comprises a block 10, roller 12, roller retainer 14, and flanged support 16. The block 10 is securely affixed to the shaft 8 by an conventional method and may, for example, be shrunk fit on the shaft. Regardless of the method of affixing the block 10 to the shaft 8, care should be taken that it is not permitted to move relative to the shaft. The block 10 has a substantially square cross-section except for the four rounded edges clearly depicted in the drawing. Surrounding the block 10 is the roller retainer 14, the interior cylindrical surface of which is in sliding contact with the four rounded edges of the block.

The roller retainer is a stepped-diameter tubular element having four longitudinal slots 18 in the portion thereof which embraces the block 10. Into the slots 18 are fitted individual rollers 12 which constitute the driving connection between the clutch and the braking mechanism 4. To support the weight of the braking mechanism 4, a flanged tubular support 16 is securely affixed to the motor end-plate 24 in any suitable manner as, for example, by screw fasteners 26. Placed about the tubular support 16 are ball bearings 20 and 22. The bearings 20 and 22 provide low friction motion between the braking mechanism 4, and the tubular support 16 about which it rotates. The bearings are separated by a spacing ring 28.

As indicated above, the braking mechanism 4 is supported for rotation by the tubular element 16. Specifically, a hub 30 of an element of the braking mechanism 4 is positioned over the axial portion of both the support 16 and the roller retainer 14. It is to be borne in mind at this point that FIG. 1 is an exploded view and, therefore, the braking mechanism 4 appears to be axially offset from the tubular support 16 and roller retainer 14. But, in actual construction, the interior surface 32 of the hub 30 envelops both the tubular support 16 and the roller retainer 14. While the interior surface 32 of the hub 30 is axially coextensive with both the support 16 and the roller retainer 14, it does not contact the outer surface of the roller retainer because the outer diameter of the roller retainer is slightly less than the inner diameter of the hub 30. This diametral differential is provided to insure that the hub 30 of the braking mechanism rotates independently of the roller retainer 14. The reason for independent motion will become apparent hereinafter. The entire load of the braking mechanism 4, when properly positioned, is borne by the tubular support 16 and for this reason the interior surface 32 of the hub 30 is in intimate contact with the ball bearings 20 and 22. Of course, the spacer 28 does not make contact with the hub 30.

Summarizing, the braking mechanism 4, when mounted for rotation about the shaft 8, has its hub 30 in intimate contact with ball bearings 20 and, hence, is supported for rotation by the tubular support 16. The roller retainer 14, while enveloped by the hub 30, is not in contact with the hub interior surface 32 and, therefore, does not bear any portion of the load of the braking mechanism 4 or otherwise interfere with the rotation of the hub.

Figure 2:
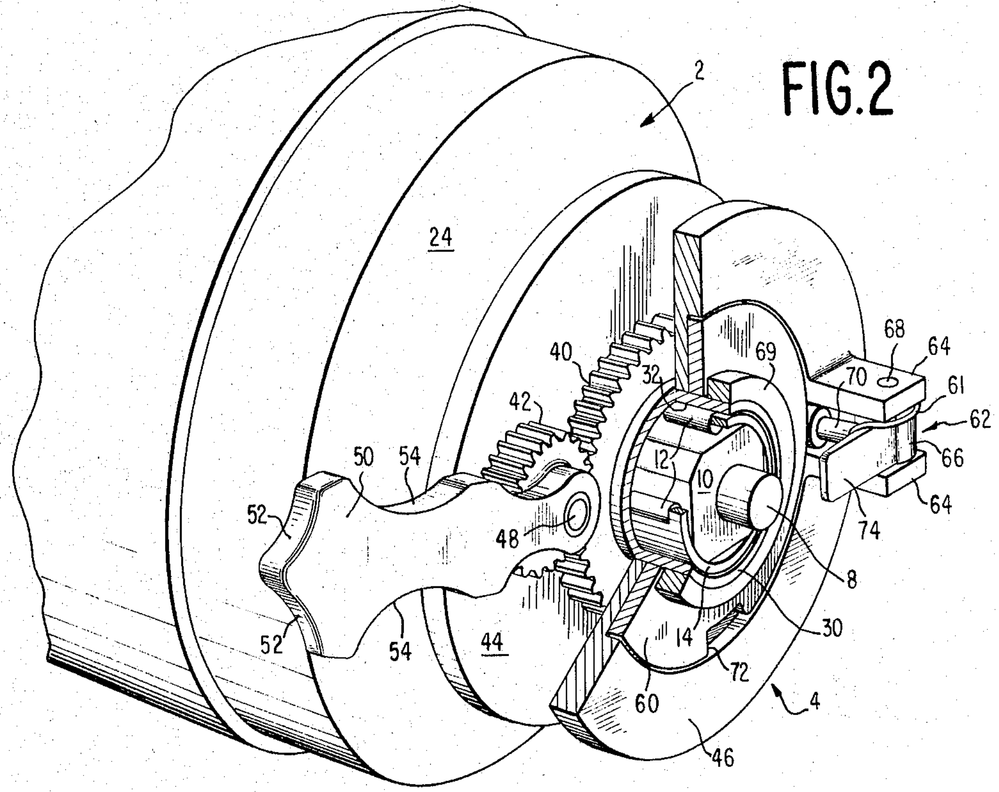
FIG. 2 depicts a partially sectioned view in perspective of the braking mechanism showing the position of the elements after a braking torque has been applied to arrest the motion of the rotating member.

Two further details of the clutch construction need amplification, namely, the dimensions of both the rollers 12 and the small diameter portion of the roller retainer 14. These structural details will be described by way of explaining the operation of the clutch itself. Proper dimensioning of the rollers 12 and retainer 14 is necessary for effecting the automatic clutch engagement and disengagement characteristic of overriding clutches. Referring to FIG. 2 and assuming that the shaft is at rest, it will be observed that the rollers 12 are located equidistant from the rounded edges of the block 10. In this configuration, the distance between the surface of the block 10 underlying the solts 18, and the slots themselves is at a maximum. Since the clutch is to be disengaged when the clutch elements occupy the position shown in FIG. 2, i.e., when the shaft is at rest, and since the driving connection between the shaft 8 and the hub 30 is through the rollers 12, the roller diameter must be made less than this maximum distance which exists between the interior hub surface 32 and the surface of the block 10 underlying the slot 18 when the shaft is at rest.

Before setting forth the criterion for determining the minimum roller diameter, it is necessary to first set forth the details of the coaction between the small diameter portion of the roller retainer 14 and the tubular support 16. Specifically, the outer diameter of the portion of the roller retainer 14 enveloped by the tubular support 16 is chosen to provide a slight frictional drag between the tubular support 16 and roller retainer. This frictional drag insures that when the shaft 8 begins to rotate, the motion of the roller retainer 14 will lag the shaft motion thereby allowing the block 10 (and the shaft 8) to advance relative to the roller retainer. Of course, there must be clearance between the shaft 8 and the inner surface of the small diameter portion of the roller retainer 14 to permit the frictional drag to establish the desired relative motion.

With the fact in mind that shaft rotation produces relative motion between the block 10 and roller retainer 14 due to frictional drag and with the further fact in mind that when the shaft rotates the clutch must become engaged, the criterion for the minimum dimensions of the rollers 12, through which the driving connection is established, can be set forth. Specifically, the diameter of the rollers 12 must be sufficiently large to insure contact between the inner surface 32 of the hub 30 and the rollers when the rollers are urged radially outward by the motion of the block 10 relative to the roller retainer 14. It will be apparent by referring to FIG. 1 that when the block 10 rotates counterclockwise relative to the roller retainer 14, the rollers 12 move along the surface of the block toward the rounded edges thereof. At the same time, the rollers 12 are being urged radially outward. Hence, it is clear that the diameter of the rollers must be large enough to insure that they will contact the inner hub surface 32 as they are radially displaced. Once the rollers do contact the inner hub surface 32, the block 10 and hub 30 become locked and the hub rotates about the tubular support 16 carrying with it the roller retainer 14.

A brief summary of the clutch operation will now follow. Starting with the shaft at rest (FIG. 2), it will be remembered that the rollers 12 are located equidistant from the rounded corners of the block 10 and are not in contact with the inner hub surface 32. Hence, no torque transmitting connection between the shaft 8 and the hub 30 exists. (It is to be noted at this point that since the hub 30 rides on the bearings 20 and 22, and is not in contact with the roller retainer 14, the roller retainer 14 remains stationary as long as the shaft 8 is motionless regardless of whether or not the hub 30 is moving.) As power is applied to the motor and the shaft begins to turn, the roller retainer 14 remains stationary due to friction between it and the tubular support 16. The resultant relative motion between the block 10 and the roller retainer 14 cams the rollers 12 into engagement with the inner hub surface 32. Once engagement is effected in this manner through the rollers 12, both the roller retainer 14 and the hub 30 are driven by the shaft 8 (FIGS. 1 and 3), the hub 30 rotating about the tubular bearings 20 and 22. When the shaft motion is arrested by the braking mechanism 4 presently to be described, the roller retainer returns, due to its inertia, to the position it occupied prior to engagement (FIG. 2), i.e., the slots 18 are positioned centrally of the block edges allowing the rollers 12 to move out of contact with the inner hub surface 32 thereby disengaging the clutch.

As stated previously, the preferred embodiment of the braking mechanism of this invention is generally indicated by the numeral 4. The braking mechanism comprises a first rotating means or sun gear 40 having a hub 30 extending axially on both sides of the gear. It is this sun gear 40 which is selectively coupled to the rotating shaft 8 through the clutch 6 and to which braking torque is applied to arrest the motion of the shaft. To transmit braking torque to the sun gear 40, a torque transmitting means is provided. The torque transmitting means comprises three planet gears 42 equally spaced about the sun gear 40 and in mating relationship therewith. The planet gears 42 are mounted on pins 48 for rotation about their axis. The pins have their ends anchored in a pair of supporting discs 44 and 46 which are located on either side of the gears 40 and 42. Thus, the pins 48 and supporting discs 44 and 46 provide a rigid mounting frame for the three planet gears 42, the gears 42, of course, being free to rotate about the pins 48.

Also sandwiched between the supporting discs 44 and 46 is the sun gear 40. The sun gear 40 is maintained in mating relation with the planet gears 42 by virtue of the fact that there are 3 equally spaced planet gears which constrain its motion. In addition, the hub 30 of the sun gear 40 extends through holes in the supporting members 44 and 46. This mounting of the supporting discs 44 and 46 for rotation about the hub 30 of the sun gear 40 would maintain the sun gear in mating relationship with the planet gears 42 even if the number of planet gears were reduced to one.

To provide the mechanical energy necessary for arresting the motion of the rotating shaft 8, three actuating means or arms 50 are connected respectively, to the planet gears 42. The arms 50 are rigidly affixed to the gears 42 at one end thereof. The connections may be effected in any suitable manner and may, for example, be by welding. As is evident, holes are provided in the arms 50 to allow the pins 48 to pass therethrough, the holes permitting the planet gears 52 to rotate uninhibited about the pins. Referring to FIG. 2, it will be observed that the arms 50 are symmetrical about their longitudinal axis and include an inwardly curved section 52 at either side of the ends thereof and inwardly curved sections 54 at the midsections thereof. This curved arm configuration permits a compact and snug fit when the arms are in the retracted position shown in FIGS. 1 and 3.

Figure 3:
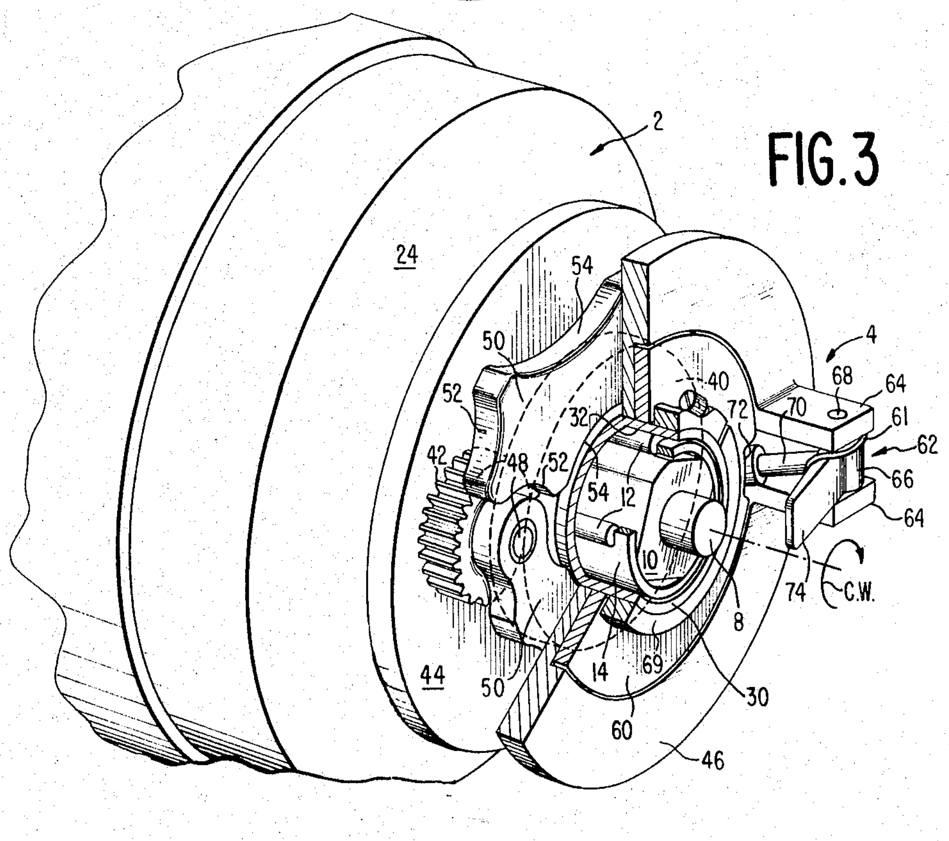
FIG. 3 depicts a partially sectioned view in perspective of a braking mechanism constructed in accordance with the principles of this invention. In this view, the elements of the braking mechanism are shown in the positions they occupy when the braking mechanism is being driven in a clockwise direction by the rotating member.

To initiate braking action when desired, means are provided which are selectively controllable, for preventing relative motion between the supporting discs 44, 46 and the sun gear 40. These selectively controllable means comprise a lever mechanism 62 rigidly mounted onto the supporting disc 46. The lever mechanism consists of a housing 64 having an L-shaped element 66 mounted for rotation about a pin 68. The L-shaped element 66 has an interlock arm 70 which is spring biased against the ring 60 by spring 61. The ring 60, which is rigidly affixed to the hub 30 of the sun gear 40, is provided with a notch 72 in its periphery for accommodating the interlock arm 70 when relative motion between the sun gear 40 and supporting discs 44 and 46 is not desired. Thus, if relative motion between the sun gear 40 and the supporting discs 44 and 46 is not desired, the interlock arm 70 is swung radially inward engaging the notch 72. Since the ring 60 is rigidly connected to the sun gear 40, as, for example, by a shrink fit, the positioning of the interlock arm 70 into the notch 72 locks the sun gear 40 and the supporting disc 46 (and 44, too). This is clear inasmuch as the interlock arm 70 is mounted to the supporting disc 46 via the pin 68 and housing 64. With the sun gear 40 constrained from motion relative to the suppporting discs 44 and 46 and in mating relationship with the planet gears 42, the planet gears are prevented from moving relative to the supporting disc. Finally, since the arms 50 are rigidly connected to the planet gears 42 they, too, do not move relative to the supporting discs 44 and 46 and sun gear 40 when the interlock arm 70 and notch 72 are engaged. Thus, with the interlock arm 70 and notch 72 engaged as shown in FIGS. 1 and 3, the entire braking mechanism including the supporting discs 44 and 46, sun gear 40 and planet gears 42 and associated arms 50 rotate together as a single unit.

Actution of the lever mechanism 62 is accomplished by applying downward pressure with suitable means (not shown) on the surface 74 of the L-shaped arm 66. This overcomes the spring biasing force and withdraws the interlock arm 70 from the notch 72 unlocking the sun gear 40 and the supporting discs 44 and 46 thereby permitting the arms 50 to fly radially outwardly under the action of centrifugal force. As the arms 50 fly out, they rotate the planet gears 42 applying a braking torque to the sun gear 40 thereby arresting the motion of the shaft 8. Of course, when the planet gears 42 move relatvely to the sun gear 40, the notched ring 60 moves relative to the interlock arm 72 causing the interlock arm to ride on the periphery of the ring. Thus, it becomes apparent that the location of the notch must be such that when the arms are in the position shown in FIGS. 1 and 3, i.e., in the retracted position, the notch 72 will be located opposite the interlock arm 70. This insures that when the shaft 8 starts rotating from a rest position and retracts the arms 50 via rotation of the sun and planet gears 40 and 42, respectively, the interlock 70 will engage the notch 72 when the arms 50 are fully retracted thereby causing the entire braking mechanism 4 to rotate as a rigid body.

To prevent the sun gear 40 from movement axially relative to the shaft 8, a set screw (not shown) is utilized. The set screw is in threaded engagement with the left hub of the sun gear 40. When it is advanced, the end thereof abuts against the peripheral surface of the spacer 28 preventing relative movement between the spacer and sun gear 40. Since the spacer 28 is constrained from axial motion by the block 10, roller retainer 14, and ball bearings 20 and 22, the entire braking mechanism is axially constrained by the coaction of the set screw, spacer 28, and hub 30. To prevent the notched ring 60 from moving axially relative to the hub 30, a collar 69 is positioned about the hub and securely fastened thereto. Thus, the set screw and collar 69 combine to prevent axial motion of the braking mechanism 4 and the clutch 6.

As for the kind of materials to be used in constructing a braking mechanism of the type hereinbefore described, conventional materials known to those skilled in the art may be used. For example, the gears may be conventional 20-degrees, full-depth, hubbed gears made from a medium carbon alloy steel such as AISI Steel No. A4340. Gears of this type exhibit good wear-resistance, load carrying capacity, and impact resistance and have been found to give satisfactory results. As for the other elements of the braking mechanism and clutch, they may likewise be constructed of a medium carbon alloy steel of the type described above. Of course, those skilled in the art will understand that neither the materials nor the dimensions of the braking mechanism are critical except to the extent that they must not interfere with the coaction described and must be suitable in view of the loading and condition expected in normal operation.

*Operation*

The description of the operation of the preferred embodiment of the braking mechanism will be presented in two parts. Both parts will assume the shaft 8 is initially at rest having been brought to a stop from a condition of rotation in some arbitrary direction, the particular direction of rotation being of no consequence. The first part of the description will consider the case wherein a shaft, initially at rest, is rotated counterclockwise and thereafter stopped by the braking mechanism of this invention. The second part considers the case of a shaft, initially at rest, which is rotated clockwise and thereafter stopped.

*Counterclockwise rotation.*—Referring to FIG. 2, the braking mechanism 4 is depicted showing the relative positions the different elements assume when shaft motion in either direction has been arrested by operation of the braking mechanism. It will be observed that the arms 50 are radially extended; and the interlock arm 70 is not in the notch 72, but rather is spring-biased into contact with the periphery of the ring 60. This orientation of the braking mechanism 4 is the result of having applied pressure, while the shaft was rotating, to the surface 74 disengaging the interlock arm 70 and notch 72 thereby permitting the arms 50 to fly outwardly under the action of centrifugal force and apply a braking torque to the sun gear 40 through the planet gears 42 to arrest the shaft motion. The shaft 8, once having stopped, produces clutch disengagement leaving the entire braking mechanism free to spin about the tubular support 16 or be stopped at will by suitable means not shown.

Now, with the braking mechanism 4 in the orientation shown in FIG. 2, assume that power is applied to the motor 2 causing the shaft 8 to rotate counterclockwise (CCW). From the previous description of the clutch 6, it will be remembered that shaft rotation in the CCW direction, or for that matter, in any direction, causes the clutch 6 to become engaged. The engaged clutch drivingly couples the shaft 8 and the sun gear 40. With the clutch engaged, the shaft 8 and sun gear 40 rotates as a unit in the CCW direction. Since relative motion between the sun gear 40 and the supporting discs 44 and 46 is not prevented, the interlock arm 70 not being in the notch 72, the CCW rotation of the sun gear 40 rotates the planet gears 42 clockwise (CW). This CW rotation of the planet gears pivots the arms 50 about the pins 48 tending to retract the arms 50 and draw them in toward the hub 30 of the sun gear 40. This CW rotation of the planet gears 42 continues until the inwardly curved sections 54 of the arms 50 are urged into contact with the hub 30. As the sun gear 40, which is being driven CCW by the shaft 8, retracts the arms 50 via the planet gears 42, the ring 60 rotates CCW relative to the supporting discs 44 and 46. By the time the arms become fully retracted (FIG. 1), the notch 72 in the ring 60 has advanced to the point opposite the interlock arm 70 and the interlock arm snaps radially inwardly under spring action locking the sun gear 40 to the supporting discs 44 and 46. This locking action also prevents relative motion between the arms 50 and the other elements of the braking mechanism 4 for reasons described in detail hereinbefore. With all elements of the braking mechanism 4 prevented from moving relative to each other, the entire braking mechanism rotates CCW with the shaft 8.

To arrest the motion of the shaft 8, it is only necessary, as indicated previously, to apply pressure to the surface 74 of the "L"-shaped arm 66 swinging the interlock arm 70 out of the notch 72. This being done, the arms 50 are free to fly radially outward inasmuch as the relative motion between the elements of the braking mechanism 4 is no longer inhibited. As the arms 50 fly outward under the action of centrifugal force, they rotate the planet gears CCW. This CCW rotation of the planet gears 42 results in the application of a CW braking torque to the sun gear 40. As will be remembered, the sun gear 40 is coupled to the shaft 8 by the clutch 6. Therefore, the braking torque produced by the movement of arms 50, which is transmitted to the sun gear 40 by the CCW motion of the planet gears 42, is applied to the shaft 8 via the clutch 6. Once the shaft 8 has stopped, the clutch disengages for reasons discussed earlier and the braking mechanism is free to spin on the tubular support 16 or be stopped by suitable means (not shown).

It is to be understood respecting the above discussion, that the power to the motor 2 is stopped when it is desired to arrest the motion of the shaft 8. If the arms 50 were released without the motor power supply being disconnected, the shaft 8 would not remain at rest. While it would be possible to instantaneously stop the shaft 8 by releasing the arms 50, providing the braking torque developed thereby was greater than the motor torque, the shaft would not remain at rest because, when the braking torque was dissipated by the weights having fully radially extended, the motor torque would again exceed the braking torque and turn the shaft. The turning once again of the shaft 8 would engage the clutch 6 and the shaft and braking mechanism would turn together as a single unit. If the arms 50 were released without the motor power supply being disconnected and if the braking torque developed by the radially moving arms 50 did not exceed the motor torque, the shaft 8 would not stop. Instead, the braking torque, acting in opposition to the motor torque, would slow down the shaft and then only temporarily.

*Clockwise rotation.*—Considering the case of arresting CW shaft motion, assume as before that the shaft 8 is at rest and the clutch 6 disengaged. The elements of the braking mechanism 4 occupy the relative positions shown in FIG. 2, the shaft 8 having previously been brought to rest from a condition of either CW or CCW rotation. Now, further assume power is applied to the motor to produce CW rotation of the shaft. The clutch 6 becomes engaged drivingly coupling the rotating shaft 8 and the sun gear 40. The interlock arm 70 being disengaged from the notch 72, does not prevent relative motion of the sun gear 40 and the supporting discs 44 and 46. Hence, the CW rotation of the sun gear 40 rotates the planet gears 42 in the CCW direction pivoting the arms 50 CCW about pins 48. This pivoting of the arms 50 continues until the inwardly curved portions 54 of the arms contacts the hub 30 whereupon the notch 72, which has meanwhile been advancing relative to the interlock arm 70, is positioned opposite the interlock arm 70 and engages therewith (FIG. 3). Engagement of the interlock arm 70 and the notch 72 prevents relative motion among the elements comprising the braking mechanism 4 causing the entire braking mechanism to rotate CW with the shaft 8.

Arrestment of the CW motion of the shaft 8 is effected in a manner similar to that of the CCW case. Specifically, concurrently with disconnecting the motor power, pressure is applied to the surface 74 of the L-shaped lever 66 disengaging the interlock arm 70 and the notch 72 allowing the elements of the braking mechanism to move relatively among themselves. The arms 50 are released from the retracted position and fly radially outward under the action of centrifugal force pivoting CW about the pins 48. This pivoting of the arm 50 under the action of centrifugal force creates a braking torque which is transmitted to the sun gear 40 by the planet gears 42. More specifically, the centrifugal force on the arms 50 rotates the planet gears CW thereby applying a braking torque to the sun gear 40 which, in turn, is applied to the shaft 8 by the clutch 6. When the shaft has stopped, the clutch disengages and the braking mechanism is free to spin on the tubular support 16 or be stopped by suitable means not shown.

A noteworthy feature of the preferred embodiment is the fact that the braking mechanism introduces no unbalance or vibration to the rotating system. This is true regardless of the angular position of the arms 50 relative to the motor. The braking mechanism 4, with respect to the shaft 8, is statically and dynamically balanced regardless of whether the arms are extended, retracted, or pivoting about the pins 48. This is true because the arms move in unison—when one extends or retracts they all extend or retract an equal amount.

Another important feature is that the braking mechanism 4, regardless of the relative orientation of its component parts, will always be ready to be utilized without any special resetting. Stated differently, regardless of the position of the arms 50 and the previous direction of shaft rotation, the braking mechanism automatically retracts the arms to the appropriate position, either that of FIG. 1 or FIG. 3, when power is applied to the shaft. Thus, the braking mechanism, without modification or adjustment, can be used to stop shaft rotation in any direction and independently of the previous direction of shaft rotation.

Another feature of note is that this braking mechanism does not require that any adjustments be made to correct for the wear of friction plates, etc. Nor are there any elements to be periodically replaced such as is typically the case with friction brakes. Furthermore, since the elements of the brake don't wear in a manner requiring adjustments, the braking time remains fixed and definite for any given speed and configuration of gears, etc. This reliability is particularly important when, e.g., it is necessary to accurately position reels of magnetic tape relative to a magnetic transducer.

As those skilled in the art will understand, numerous variations and modifications in the details of construction and operation of the preferred embodiment hereinbefore described may be made without departing from the novel principles of this invention. For example, instead of utilizing gears as positive torque transmission elements, discs having engaging friction contact surfaces could be used.

An aspect of the braking mechanism subject to extensive variation relates to the number, size, and configuration of the arms and gears. Appreciating the fact that the braking torque available for arresting shaft rotation depends on the shaft speed and moment of inertia of the arms about the pins 48, it becomes apparent that at any given speed for any given set of arms 50, the braking time depends on the ratio of the number of gear teeth in the planet gears to the number in the sun gear. Reducing the ratio increases the required stopping time because the braking torque is applied over a longer period of time. Likewise increasing the ratio decreases the stopping time. It should also be appreciated that varying the number of arms or their moment of inertia about the pins 48 will vary the braking torque and effect the braking time. Also, by relocating the notch 72 it is possible to control the extent to which the arms are retracted and the available braking torque.

The preferred embodiment of the invention, which has been heretofore described in detail, utilized a set of radially extending arms 50 to store the braking torque during the period of shaft rotation. This braking torque was seen to be applied to the sun gear 40 via the planet gears 42 when the arms 50 were released from the retracted position and permitted to fly out under the action of centrifugal force. However, other means might be utilized to store braking torque without departing from the principles of this invention.

For example, a plurality of racks cooperating with an internally toothed sun gear could be substituted for the arms 50 and pinions 42. Specifically, referring to FIGS. 4(*a*) and 4(*b*), a pair of racks 80 and 82 symmetrically positioned about the center of an internally toothed sun gear 84 and mounted in suitable guides (not shown) might be used. Suitable means (not shown), which are selectively operable, are provided to retain the racks in the retracted position during shaft rotation in much the same manner as the arms 50 are held in the retracted position prior to braking. When, of course, it is desired to arrest the motion of the shaft, the selectively operable means are deactivated and the racks fly outwardly under the action of centrifugal force applying a braking torque to the sun gear 84 via the planet gears 86. Stops (not shown) are positioned to limit the travel of the racks. Thus, it is seen that a pair of racks can be substituted for the braking arms 50 to store the necessary braking torque to arrest the motion of a rotating member. Of course, to insure that the racks will fly out radially under the action of centrifugal force, it is important that the longitudinal axis of the rack not make an angle of 90° with the line connecting the centers of the gears. The racks must be angled so that there is a component of force exerted on the rack other than a radial one, due to centrifugal force.

It is also possible to utilize spring elements to provide the torque storing function of the braking mechanism of this invention. To utilize this form of braking torque storage means the arms 50 of the preferred embodiments are replaced by coil springs, one end of the spring being affixed to the pin 48 and the other to the pinions 42. When the shaft 8 begins to drive the sun gear 40, the pinions turn winding or unwinding the springs depending on the direction of rotation. When the springs have been stressed sufficiently to store the requisite braking torque, the selectively operable pinion locking means are activated locking the pinions in place relative to the supporting discs 42 and 44. Shaft motion is simply and quickly arrested merely by deactivating the selectively operable means allowing the stressed springs to unwind, and in the process, apply a braking torque to the sun gear 40 via the planet gears 42.

While the invention has been particularly shown and described with reference to preferred embodiments thereof, it will be understood by those skilled in the art that the foregoing and other changes in form and details may be made therein without departing from the spirit and scope of the invention.

I claim:

1. A braking mechanism for arresting the motion of a rotating member, said braking mechanism comprising:
   a first means mounted for rotation;
   clutch means selectively coupling said rotating member and said first means for imparting rotational motion to said first means, said clutch means being engaged when said rotating member rotates and disengaged when said rotating member is at rest;
   second means mounted for rotation;
   energy storing means mechanically linked to said first means and responsive to rotation of said first means for storing energy, said energy storing means occupying one position when storing energy and a different position when not storing energy; and
   dual purpose means mounted on said second means and movable relative thereto between a first and second position, said dual purpose means also being coupled to said first means and said energy storing means for preventing relative motion between said energy storing means and said first means when said dual purpose means is in said first position and said energy storing means is in said one position, and for applying energy stored in said energy storing means to said first means in a braking torque mode to arrest the motion of said rotating member when said dual purpose means moves from said first position to said second position in response to movement of said energy storing means from said one position to said different position.

2. A braking mechanism for arresting the motion of a rotating member, said braking mechanism comprising:
   a first means mounted for rotation and having a first peripheral contact surface;
   clutch means selectively coupling said rotating member and said first means for imparting rotational motion to said first means, said clutch means being engaged when said rotating member rotates and disengaged when said rotating member is at rest;
   second means mounted for rotation;
   torque transmitting means mounted on said second means for motion relative thereto and having a second peripheral contact surface in torque transmitting engagement with said first peripheral contact surface;
   first selectively operable means mechanically connected to said torque transmitting means for preventing relative motion between said torque transmitting means and said second means; and
   braking torque storage means mechanically connected to said torque transmitting means for imparting motion thereto, said motion being transmitted by said contact surfaces to said first means for applying a braking torque to said first means to arrest the motion of said rotating member.

3. A braking mechanism for arresting the motion of a rotating member, said braking mechanism comprising:
   a first disc mounted for rotation and having a peripheral contact surface thereon;
   clutch means selectively coupling said rotating member and said first disc for imparting rotational motion to said first disc, said clutch means being engaged when said rotating member rotates and disengaged when said rotating member is at rest;
   a supporting disc mounted for rotation;
   a torque transmitting disc mounted on said supporting disc, said torque transmitting disc being mounted for rotation about its axis with its periphery in torque transmitting engagement with said contact surface;

means rigidly connected to said torque transmitting disc, the center of gravity of said means being radially replaced relative to said axis of said torque transmitting disc; and selectively operable means for preventing relative motion between said torque transmitting disc and said first disc.

4. A braking mechanism for arresting the motion of a rotating member, said braking mechanism comprising:

a first gear mounted for rotation about its axis;

clutch means selectively coupling said first gear and said rotating member for imparting rotational motion to said first gear, said clutch being engaged when said rotating member rotates and disengaged when said rotating member is at rest;

a supporting disc mounted for rotation about its axis;

a second gear mounted on said supporting disc, said second gear being mounted for rotation about its axis and in mating relationship with said first gear;

means rigidly connected to said second gear and having a center of gravity displaced radially relative to said axis of said second gear; and selectively operable means for preventing relative motion between said second gear and said first gear.

5. A braking mechanism for arresting the motion of a rotating member, said braking mechanism comprising:

a first means mounted for rotation;

clutch means selectively coupling said rotating member and said first means for imparting rotational motion to said first means, said clutch means being engaged when said rotating member rotates and disengaged when said rotating member is at rest;

supporting means mounted for rotation;

braking means including torque transmitting means mounted on said supporting means and movable relative thereto, said torque transmitting means being in torque transmitting engagement with said first means, said braking means also including actuating means mounted for motion relative to said supporting means and in motion transmission engagement with said torque transmitting means, said actuating means being movable under the action of centrifugal force from a first position to a second position for imparting motion to said torque transmitting means for arresting the motion of said rotating member, said actuating means being movable to said first position in response to motion transmitted to said torque transmitting means by rotation of said first means; and selectively operable means for preventing relative motion between said first means and said torque transmitting means.

6. A braking mechanism for arresting the motion of a rotating member, said braking mechanism comprising:

a first gear mounted for rotation about its axis, said first gear having a first and a second extended hub on opposite sides thereof;

a clutch means selectively coupling said rotating member and said first gear for imparting rotational motion to said first gear, said clutch means being engaged when said rotating member rotates and disengaged when said rotating member is at rest;

a first and a second supporting disc mounted for rotation about their axes on said first and second hubs, respectively;

a second gear located between said supporting discs and mounted thereto, said second gear being mounted for rotation about its axis in mating relationship with said first gear;

means rigidly connected to said second gear and having a center of gravity radially displaced relative to said second gear; and selectively operable means for preventing relative motion between said first and second gears.

7. The combination for arresting the motion of a rotating member, said combination comprising:

a first means mounted for rotation and having a first peripheral contact surface;

supporting means mountable for rotation;

torque transmitting means mounted on said supporting means for motion relative thereto and having a second peripheral contact surface in torque transmitting engagement with said first peripheral contact surface;

selectively operable means mechanically connected to said torque transmitting means for preventing relative motion between said torque transmitting means and said supporting means; and means mechanically connected to said torque transmitting means for imparting motion thereto, said motion being transmitted by said contact surfaces to said first means for applying a braking torque to said first means to arrest the motion of said rotating member.

8. A braking mechanism for arresting the motion of a rotating member, said braking mechanism comprising:

a first disc mounted for rotation and having a peripheral contact surface thereon;

a supporting disc mounted for rotation;

a torque transmitting disc mounted on said supporting disc, said torque transmitting disc being mounted for rotation about its axis with its periphery in torque transmitting engagement with said contact surface;

means rigidly connected to said torque transmitting disc, the center of gravity of said means being radially displaced relative to said axis of said torque transmitting disc; and selectively operable means for preventing relative motion between said torque transmitting disc and said first disc.

9. A braking mechanism for arresting the motion of a rotating member, said braking mechanism comprising:

a first gear mounted for rotation about its axis;

a supporting disc mounted for rotation about its axis;

a second gear mounted on said supporting disc, said second gear being mounted for rotation about its axis and in mating relationship with said first gear;

means rigidly connected to said second gear and having a center of gravity displaced radially relative to said axis of said second gear; and selectively operable means for preventing relative motion between said second gear and said first gear.

10. A braking mechanism for arresting the motion of a rotating member, said braking mechanism comprising:

a first means mounted for rotation;

supporting means mounted for rotation;

braking means including torque transmitting means mounted on said supporting means and movable relative thereto, said torque transmitting means being in torque transmitting engagement with said first means, said braking means also including actuating means mounted for motion relative to said supporting means and in motion transmission engagement with said torque transmitting means, said actuating means being movable under the action of centrifugal force from a first position to a second position for imparting motion to said torque transmitting means for arresting the motion of said rotating member, said actuating means being movable to said first position in response to motion transmitted to said torque transmitting means by rotating said first means; and selectively operable means for preventing relative motion between said first means and said torque transmitting means.

11. A braking mechanism for arresting the motion of a rotating member, said braking mechanism comprising:

a first gear mounted for rotation about its axis, said first gear having a first and a second extended hub on opposite sides thereof;

a first and a second supporting disc mounted for rotation about their axes on said first and second hubs, respectively;

a second gear located between said supporting discs and mounted thereto, said second gear being mounted for rotation about its axis in mating relationship with said first gear;

means rigidly connected to said second gear and having a center of gravity radially displaced relative to said second gear; and selectively operable means for preventing relative motion between said first and second gears.

References Cited by the Examiner

UNITED STATES PATENTS

| | | | |
|---|---|---|---|
| 3,030,049 | 4/1962 | Pilkington et al. | 244—1 |
| 3,128,845 | 4/1964 | Parker | 188—1 |

DAVID J. WILLIAMOWSKY, *Primary Examiner.*

A. T. McKEON, *Assistant Examiner.*